United States Patent [19]
Okada et al.

[11] Patent Number: 5,424,546
[45] Date of Patent: Jun. 13, 1995

[54] SCINTILLATION COUNTER HAVING TWO SCINTILLATION FIBERS PROVIDED IN SERIES AND WHICH EMIT AT DIFFERENT WAVELENGTHS

[75] Inventors: Hiroyuki Okada; Takaji Yamashita, both of Hamamatsu, Japan

[73] Assignee: Hamamatsu Photonics K.K., Shizuoka, Japan

[21] Appl. No.: 184,198

[22] Filed: Jan. 18, 1994

[30] Foreign Application Priority Data

Jan. 18, 1993 [JP] Japan .................................. 5-005844

[51] Int. Cl.⁶ .............................................. G01T 1/203
[52] U.S. Cl. ..................... 250/367; 250/368; 250/486.1; 128/659
[58] Field of Search ................... 250/367, 368, 486.1; 128/659

[56] References Cited

U.S. PATENT DOCUMENTS

| 5,008,546 | 4/1991 | Mazziotta et al. | 250/367 |
| 5,087,818 | 2/1992 | Bellian et al. | 250/368 |
| 5,313,065 | 5/1994 | Reed | 250/368 |

FOREIGN PATENT DOCUMENTS

| 58-158848 | 9/1983 | Japan . |
| 2-206786 | 8/1990 | Japan . |
| 2-266286 | 10/1990 | Japan . |
| 4-274792 | 9/1992 | Japan . |

OTHER PUBLICATIONS

J. E. Litton et al., "Transcutaneous Measurement of the Arterial Input Function in Positron Emission Tomography," IEEE Transactions on Nuclear Science, vol. 37, No. 2, Apr. 1990.

Primary Examiner—Carolyn E. Fields
Attorney, Agent, or Firm—Sughrue, Mion, Zinn, Macpeck & Seas

[57] ABSTRACT

It is an objective of the present invention to provide a scintillation counter that can measure the intensity of only $\beta$ rays. Two scintillation fibers (11 and 12) which emit different wavelengths are provided in series to a probe (10). One of the scintillation fibers (12) is covered with a $\beta$-ray shield. The optical signal generated at the probe (10) is transmitted through the optical fiber (20) and separated by the light separating element (31). One portion of the separated optical signal is incident on a light detector (32) and the intensity of the incident light detected. The other portion of the separated optical signal is incident on a light detector (33) and the intensity of the incident light detected.

23 Claims, 11 Drawing Sheets

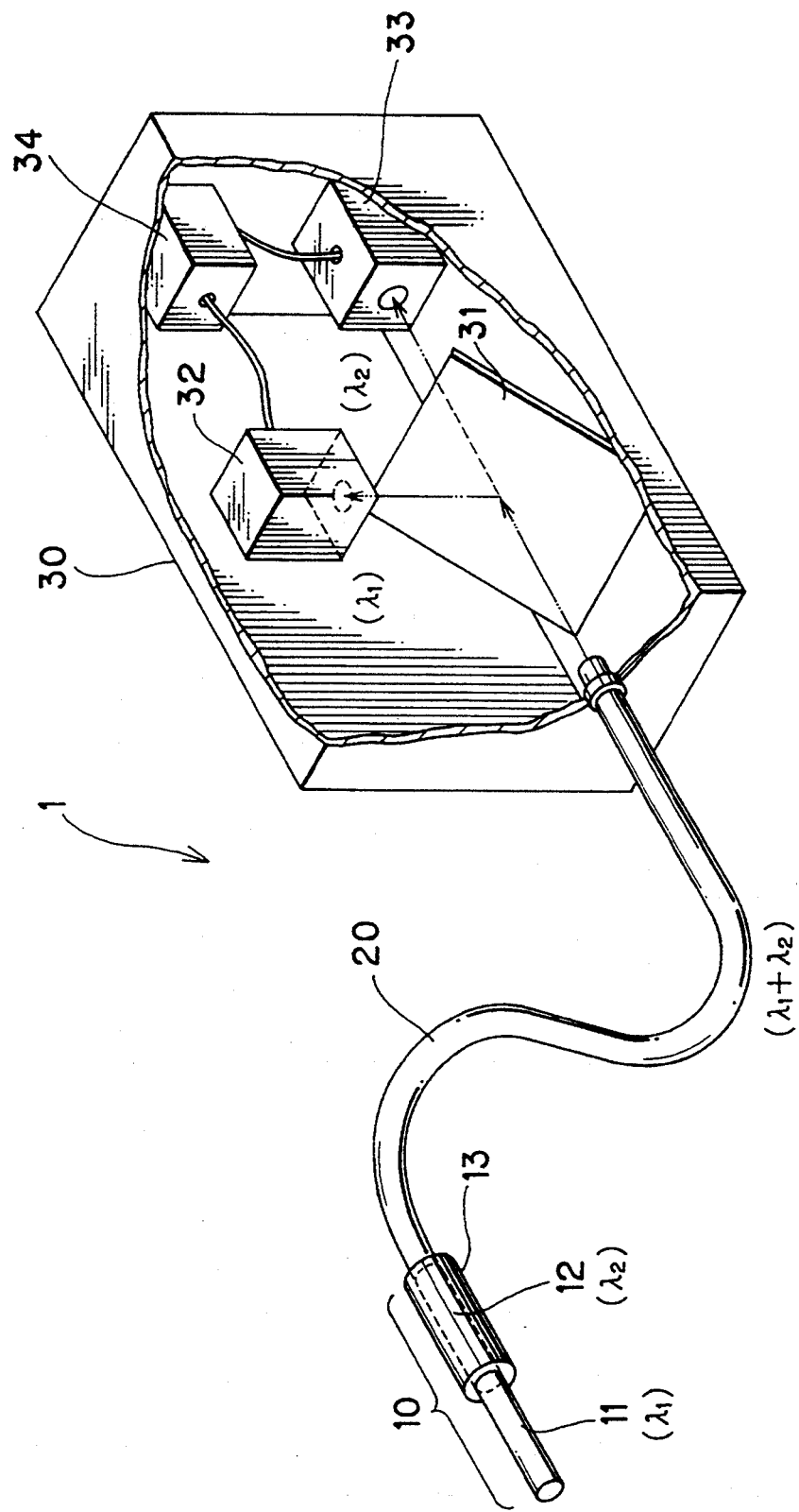

INTEGRATED SHAPE

BURIED SHAPE

EXTERNALLY MOUNTED SHAPE

INTEGRATED SHAPE

BURIED SHAPE

EXTERNALLY MOUNTED SHAPE

SCINTILLATION COUNTER HAVING TWO SCINTILLATION FIBERS PROVIDED IN SERIES AND WHICH EMIT AT DIFFERENT WAVELENGTHS

BACKGROUND OF THE INVENTION

1. Field of the Invention

The present invention relates to a scintillation counter for detecting radiations such as $\beta$ rays. More particularly, the present invention relates to the scintillation counter being for in vitro or in vivo detection of $\beta$ rays or being for detecting $\beta$ rays from radioactive contamination in small diameter pipes at, for example, nuclear power plants.

2. Description of the Related Art

Japanese Patent Application Publication Kokai No. HEI2-206786 describes the scintillation counter 50 shown in FIG. 1 (a) for in vivo detection of $\beta$ rays emitted from an organism injected with a radioactive substance. $\beta$ rays include electrons ($\beta^-$) and positrons ($\beta^+$).

As shown in FIG. 1 (a), the scintillation counter 50 includes a scintillation fiber 51 and an optical detector 52 joined by an optical fiber 53.

To measure the concentration of radiation in a certain area of an object to be measured, the scintillation fiber 51 is inserted as a probe into the area. However, the scintillation fiber 51 also picks up $\gamma$ rays from other sources, which are then converted into a signal. The signal appears as a background noise which lowers the precision of the $\beta$ ray measurement.

Japanese Patent Application Publication Kokai No. HEI4-274792 describes a scintillation counter 60 shown in FIG. 1 (b) for detecting the distribution of radioactive substances in the internal wall of a pipe. The scintillation probe 61 of the scintillation counter 60 has a bundle of a plurality of scintillation fibers. The bundle consists of two groups of parallel scintillation fibers: a measurement fiber group 61A and a reference fiber group 61B. The measurement fiber group 61A surrounds the reference fiber group 61B. The reference fiber group 61B consists of a plurality of parallel scintillation fibers 161B each of which is covered with a shield material 64 for blocking out $\beta$ rays, as shown in FIG. 1(c). Therefore, the scintillation fibers 161B of the reference fiber group 61B are sensitive to only $\gamma$ rays. To the contrary, the measurement fiber group 61A consists of a plurality of parallel scintillation fibers 161A each of which is not covered with such a shield material 64. Accordingly, the scintillation fibers 161A of the measurement fiber group 61A are sensitive to both $\beta$ rays and $\gamma$ rays, similarly as the scintillation fiber 51 of FIG. 1(a). A plurality of optical fibers 63A connect the plural scintillation fibers 161A to an optical detector 62A. Similarly, a plurality of optical fibers 63B connect the plural scintillation fibers 161B to an optical detector 62B. The fiber bundle 61 can be inserted as a probe into an object to be measured. The intensity of $\beta$ rays only can be measured by subtracting the value detected by the optical detector 62B from the value detected by the optical detector 62A.

This publication also describes the scintillation counter 70 shown in FIG. 1 (d) wherein a plurality of scintillation fibers 171A of a measurement fiber group 71A are paired with a plurality of scintillation fibers 171B (each covered with a $\beta$-ray shield material 64) of the reference fiber group 71B. A scintillation probe 71 is formed by attaching the pairs of scintillation fibers 171A and 171B to the outer surface of a cylindrical holder 75 at appropriate intervals in the circumferential direction.

Each of the probes 61 and 71 of the above-described scintillation counters is thus formed from a bundle of a plurality of parallel scintillation fibers for detecting the distribution of radiation. Accordingly, the probes 61 and 71 become too thick to be inserted into pipes with small diameters or living objects, particularly small animals.

SUMMARY OF THE INVENTION

It is conceivable to use the single-fiber scintillation counter 60 shown in FIG. 1(a) in combination with another single-fiber scintillation counter 80 shown in FIG. 1(e). The scintillation counter 80 has a single scintillation fiber 81, covered with a $\beta$-ray shield material 84, connected to an optical detector 82 by an optical fiber 83. In this case, two fibers, i.e., the scintillation fiber 61 and the scintillation fiber 81, must be inserted as two probes into the object to be measured.

When the two probes are used side by side and in contact as shown in FIG. 1(f), the problem remains in that insertion into small animals or narrow pipes is still difficult. An additional problem is produced in that the $\beta$-ray shield 84 on the scintillation fiber 81 prevents $\beta$ rays from reaching the side of the scintillation fiber 51 adjoining the scintillation fiber 81. This prevents equal access of $\beta$ rays to all sides of the fiber 51, which produces polarity in regards to the position of the object to be measured, thereby reducing precision of measurements.

It is also conceivable to insert the two probes into adjacent but separate positions as shown in FIG. 1 (g). This would allow inserting the probes into living objects. However, when measuring on a microscopic scale, inserting the probes in a position only slightly off from the actual desired position to be measured can result in a large drop in precision. Although this method would provide precise measurements when the two probes are immersed in a liquid with a uniform concentration of radioactivity, precision drops when measuring an object with variable concentration distribution such as a living body.

The present invention is achieved to solve the above-described problems, and an object of the present invention is to provide a scintillation counter for detecting $\beta$ rays only with high accuracy.

Another object of the present invention is to provide a scintillation counter which can detect $\beta$ rays in a living body such as a small animal, in a small pipe, etc.

In order to attain the objects, the present invention provides a scintillation counter for detecting an intensity of a desired kind of radiation, comprising:

a measurement scintillation fiber having first and second ends along a first longitudinal optical axis thereof and having a peripheral surface extending parallel to the longitudinal optical axis between the first and second ends, the measurement scintillation fiber receiving a desired kind of radiation and another kind of radiation incident on the peripheral surface thereof and generating a first scintillation light having a first wavelength and having an intensity corresponding to a total intensity of the desired kind of radiation and the other kind of radiation;

a reference scintillation fiber having first and second ends along a longitudinal optical axis thereof and having a peripheral surface extending parallel to the longitudinal optical axis between the first and second ends, the peripheral surface being covered with a radiation shield film for preventing the desired kind of radiation from being incident on the peripheral surface while allowing the other kind of radiation to be incident on the peripheral surface, the reference scintillation fiber generating a second scintillation light having a second wavelength different from the first wavelength and having an intensity corresponding to an intensity of the other kind of radiation, the first end of the reference scintillation fiber being optically connected to the first end of the measurement scintillation fiber so as to axially align the reference scintillation fiber with the measurement scintillation fiber;

an optical fiber having first and second ends along a fiber longitudinal optical axis thereof, the first end of the optical fiber being optically connected to one of the second end of the measurement scintillation fiber and the second end of the reference scintillation fiber for receiving the first and second scintillation lights generated in the first and second scintillation fibers, the optical fiber transmitting the first and second scintillation lights from the first end toward the second end;

light separating means positioned confronting to the second end of the optical fiber for receiving the first and second scintillation lights transmitted to the second end and separating the first and second scintillation lights from each other;

a first light detecting means for receiving the first scintillation light separated by the light separating means and detecting the intensity of the first scintillation light representative of the total intensity of the desired kind of radiation and the other kind of radiation, the first light detecting means producing a first signal indicative of a value of the total intensity of the desired kind of radiation and the other kind of radiation;

a second light detecting means for receiving the second scintillation light separated by the light separating means and detecting the intensity of the second scintillation light representative of the intensity of the other kind of radiation, the second light detecting means producing a second signal indicative of a value of the intensity of the other kind of radiation; and difference calculating means for receiving the first and second signals and calculating a value of difference between the value indicated by the second signal and the value indicated by the first signal which indicates a value of intensity of the desired kind of radiation.

According to another aspect, the present invention provides a scintillation probe for detecting an intensity of a desired kind of radiation, comprising:

a measurement scintillation fiber having first and second ends along a first longitudinal optical axis thereof and having a peripheral surface extending parallel to the longitudinal optical axis between the first and second ends, the measurement scintillation fiber receiving a desired kind of radiation and another kind of radiation incident on the peripheral surface thereof and generating a first scintillation light having a first wavelength and having an intensity corresponding to a total intensity of the desired kind of radiation and the other kind of radiation; and a reference scintillation fiber having first and second ends along a longitudinal optical axis thereof and having a peripheral surface extending parallel to the longitudinal optical axis between the first and second ends, the peripheral surface being covered with a radiation shield film for preventing the desired kind of radiation from being incident on the peripheral surface while allowing the other kind of radiation to be incident on the peripheral surface, the reference scintillation fiber generating a second scintillation light having a second wavelength different from the first wavelength and having an intensity corresponding to an intensity of the other kind of radiation, the first end of the reference scintillation fiber being optically connected to the first end of the measurement scintillation fiber so as to axially align the reference scintillation fiber with the measurement scintillation fiber.

According to a further aspect, the present invention provides a scintillation counter for detecting an intensity of $\beta$ rays, comprising:

a probe portion including first and second scintillation fibers optically connected to each other, the first and second scintillation fibers generating scintillation light of different wavelengths upon incidence of radiation thereto, intensity of the scintillation light corresponding to an intensity of the incident radiation, the second scintillation fiber being covered with a $\beta$-ray shield;

an optical fiber optically connected to the probe portion for transmitting the scintillation light generated at the probe portion;

light separating means for separating, by wavelength, the scintillation light transmitted by the optical fiber;

first light detecting means for detecting first intensity of the scintillation light generated at the first scintillation fiber and separated by the light separating means;

second light detecting means for detecting second intensity of the scintillation light generated at the second scintillation fiber and separated by the light separating means, a difference between the first intensity and the second intensity indicating intensity of $\beta$ rays; and difference calculating means for calculating the difference between the first intensity and the second intensity so as to obtain a value of intensity of ray.

According to the scintillation counter of the present invention, two scintillation fibers with different optical wavelengths are connected in series into a probe, one scintillation fiber being covered with a $\beta$-ray shield.

The optical signal (scintillation light) generated by the scintillation fiber not covered with a $\beta$-ray shield represents the intensity of both $\beta$ rays and $\gamma$ rays. This optical signal is transmitted through the optical fiber and separated by the light separating means toward the first optical detector means. The separated optical signal is incident upon the first optical detector means where its intensity is detected.

To the contrary, because the scintillation fiber covered with a $\beta$-ray shield has its sensitivity for $\beta$ rays greatly reduced, the optical signal (scintillation light) generated by this scintillation fiber represents almost only the intensity of $\gamma$ rays. The optical signal is transmitted through the optical fiber and separated by the light separating means toward the second optical detector means. Then, the separated optical signal is incident on the second optical detector means where its intensity is detected.

Consequently, the intensity of only the β rays can be detected by subtracting the intensity of the optical signal (representing the intensity of only γ rays) detected by the second optical detector means from the intensity of the optical signal (representing the intensity of both β rays and γ rays) detected by the first optical detector.

BRIEF DESCRIPTION OF THE DRAWINGS

The above and other objects, features and advantages of the invention will become more apparent from reading the following description of the preferred embodiments taken in connection with the accompanying drawings in which:

FIG. 1 (b) is a perspective view of another conventional scintillation counter;

FIG. 1 (c) shows each of a plurality of scintillation fibers of a reference fiber group of FIG. 1 (b) which is covered with a β-ray shield;

FIG. 1 (d) is a perspective view of a further conventional scintillation counter;

FIG. 1 (e) is a perspective view of a scintillation counter which can be used in combination with the conventional scintillation counter of FIG. 1(a);

FIG. 1 (f) shows the manner how the probes of FIGS. 1 (a) and 1 (e) are placed side by side and inserted into an object to be measured;

FIG. 1 (g) shows the manner how the probes of FIGS. 1 (a) and 1 (e) are placed apart from each other and inserted into a living body;

FIG. 2 is a perspective diagram showing an overall structure of a scintillation counter according to a first preferred embodiment of the present invention;

FIG. 3 (b) shows the manner how the probe of FIG. 2 is inserted into a living body;

FIG. 3 (c) shows the manner how the probe of FIG. 2 is inserted into a pipe;

FIG. 5 (b) is a cross-sectional diagram showing another concrete example of structure of the area around the probe;

DETAILED DESCRIPTION OF THE PREFERRED EMBODIMENTS

Figure 1A:
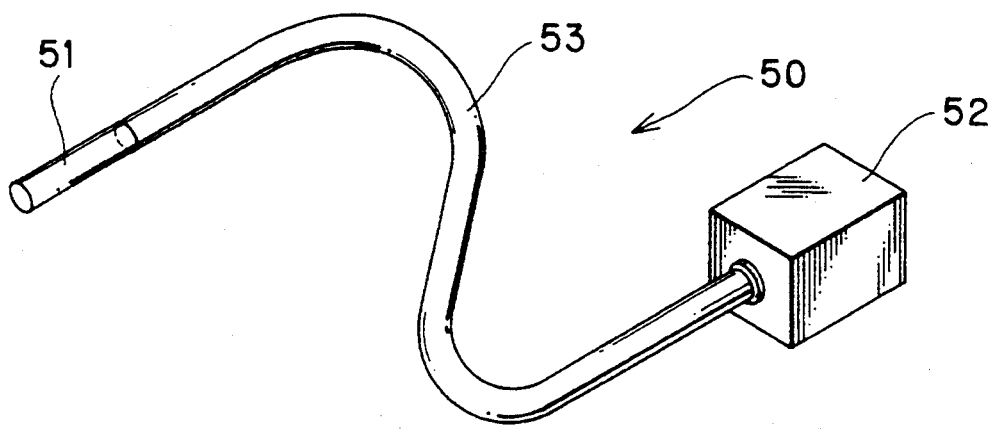
FIG. 1 (a) is a perspective view of a conventional scintillation counter.
Figure 1B:
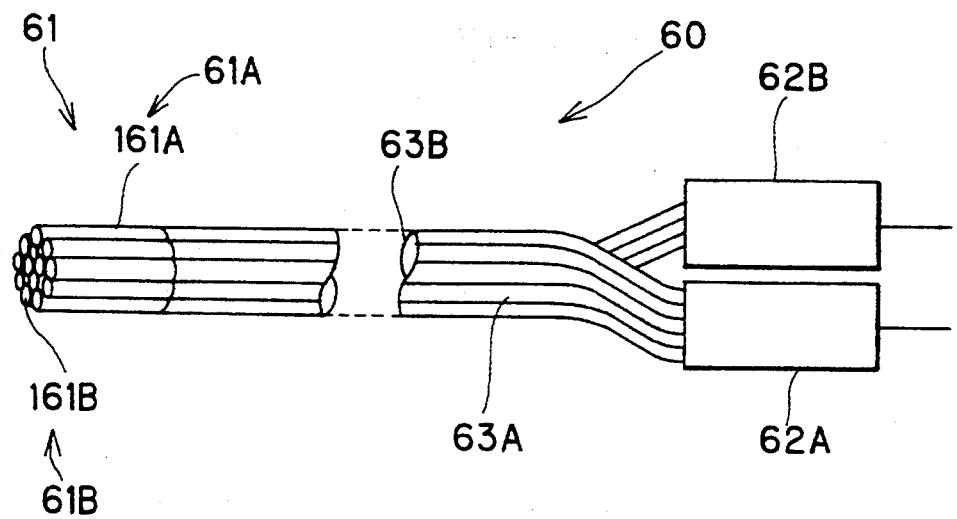
Figure 1C:
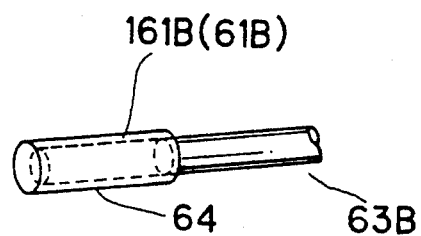
Figure 1D:
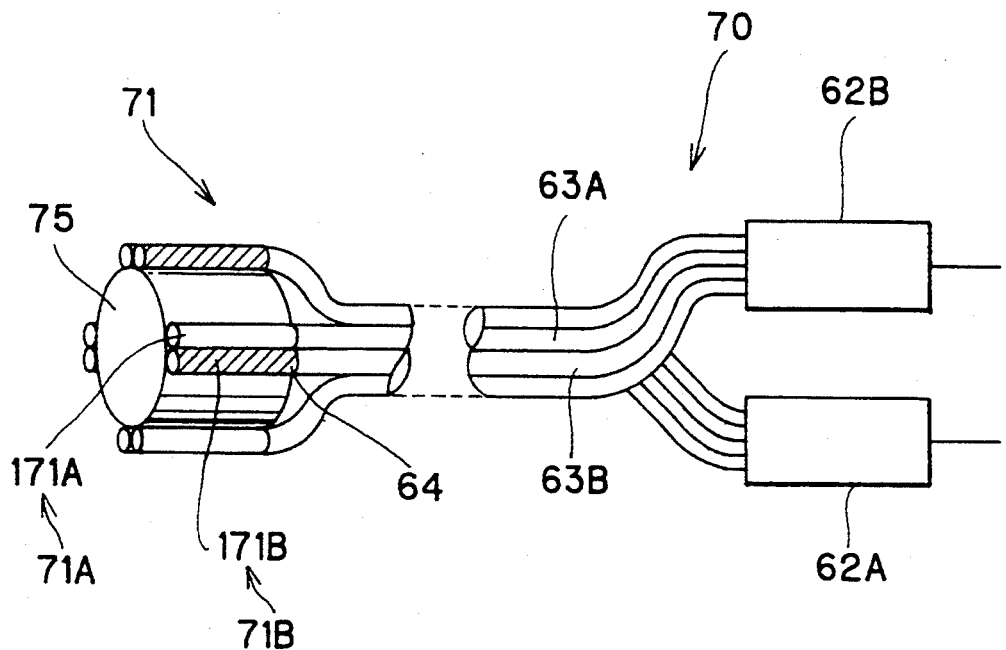
Figure 1E:
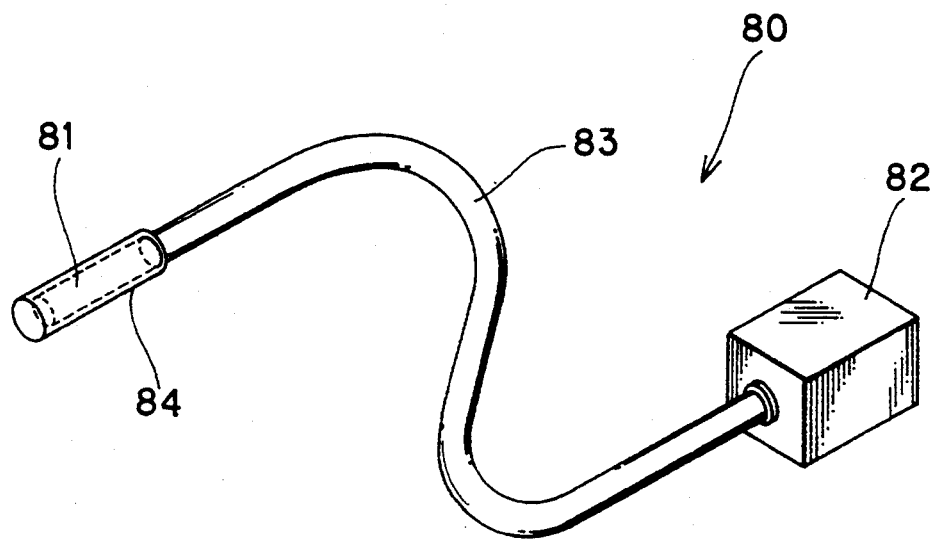
Figure 1F:
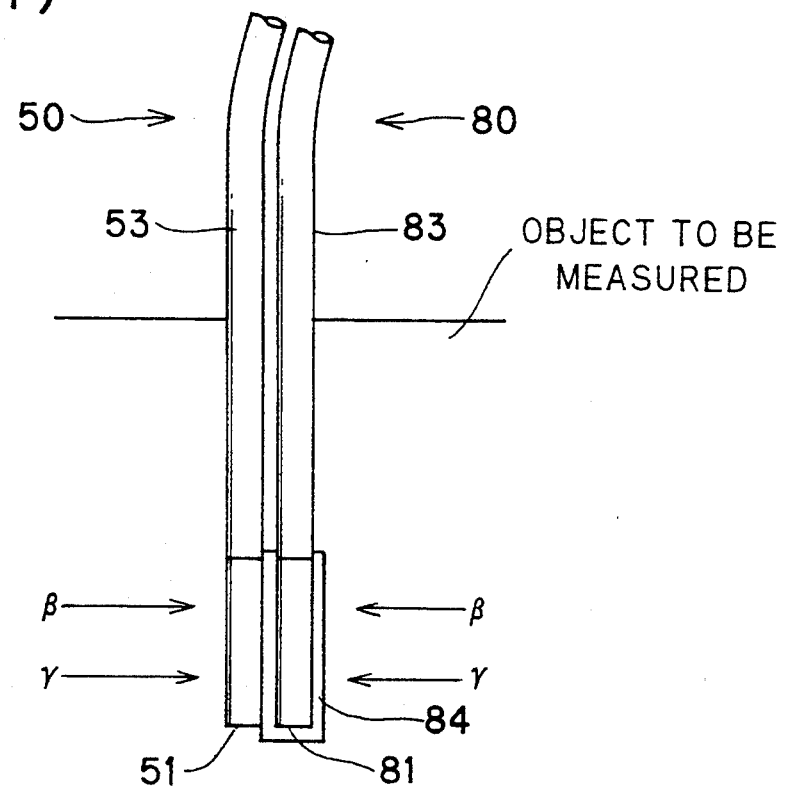
Figure 1G:
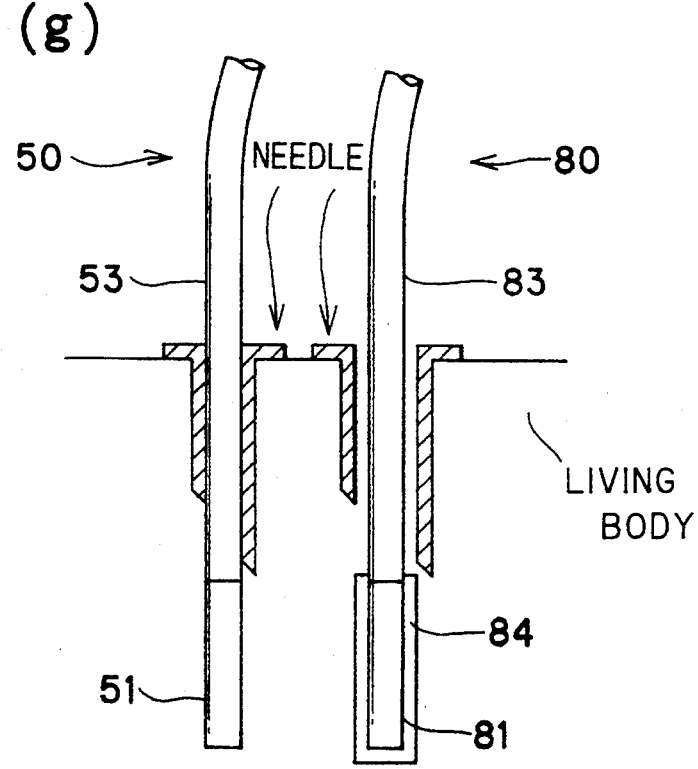

A scintillation counter according to preferred embodiments of the present invention will be described while referring to the accompanying drawings wherein like parts and components are designated by the same reference numerals to avoid duplicating description.

A scintillation counter according to a first preferred embodiment of the present invention will be described below while referring to FIGS. 2 through 8.

FIG. 2 is a perspective diagram showing the overall structure of a scintillation counter 1 according to the first preferred embodiment. The scintillation counter 1 according to the first preferred embodiment includes: a probe 10 for being inserted into an appropriate position in the object to be measured; an optical fiber 20 for transmitting light (i.e., optical signal) emitted from the probe 10; and a detection portion 30 for detecting the intensity of the optical signal transmitted by the optical fiber 20.

The probe 10 is provided with two scintillation fibers 11 and 12 optically connected in series with a common optical axis. The scintillation fiber (reference fiber) 12 is surrounded by a β-ray shield material film 13 which obstructs passage of β rays so that only γ rays can be incident on the side surface of the scintillation fiber 12. As the β-ray shield material film 13, tungsten, iron, lead, or the like can be used. Tungsten is most preferable. On the other hand, because the scintillation fiber (measurement fiber) 11 is not covered with such a β-ray shield material 13, both β rays and γ rays can be incident on the scintillation fiber 11.

According to the present invention, the scintillation fiber 11 is formed from such a scintillation fiber as generates scintillation light with wavelength $\lambda_1$ upon incidence of radiation such as β- and γ- rays thereto, with the intensity of the scintillation light corresponding to the intensity of the incident radiation. The scintillation fiber 12 is formed from such a scintillation fiber as generates scintillation light with another wavelength 2 upon incidence of radiation such as β- and γ- rays thereto, with the intensity of the scintillation light corresponding to the intensity of the incident radiation. The scintillation light generated in each of the scintillation fibers can therefore be considered an optical signal which includes information on the intensity of the corresponding incident radiation. According to the present invention, because the scintillation fiber 11 is not covered with the β-ray shield material 13, the scintillation fiber 11 generates scintillation light with wavelength $\lambda_1$ upon incidence of β- and γ- rays thereto, with the intensity of the scintillation light corresponding to the total intensity of the incident β- and γ- rays. To the contrary, because the scintillation fiber 12 is covered with the β-ray shield material 13, the scintillation fiber 12 generates scintillation light with the wavelength $\lambda_2$ upon incidence of γ- rays thereto, with the intensity of the scintillation light corresponding to the intensity of the incident γ- rays.

As shown in FIG. 3(a), the cylindrically-shaped scintillation fiber 11 is formed from plastic and includes a polystyrene-based scintillator core 11a and a clad 11b with polymethyl methacrylate (PMMA). Similarly, the cylindrically-shaped scintillation fiber 12 is formed from plastic and includes a polystyrene-based scintillator core 12a and a clad 12b with polymethyl methacrylate (PMMA). The scintillation fibers 11 and 12 are connected in series using, for example, adhesive or thermal fusion so that they are optically connected with their optical axes 11X and 12X aligned. Similarly, the scintillation fiber 12 and the optical fiber 20 are connected in series using, for example, adhesive or thermal fusion so that they are optically connected with their optical axes 12X and 20X aligned. Thus, all the optical axes 11X, 12X and 20X are aligned. An appropriately thick $\beta$-ray shield 13 surrounds and covers a peripheral surface 12p (i.e., an external surface of the clad 12b) of the scintillation fiber 12.

Figure 3:
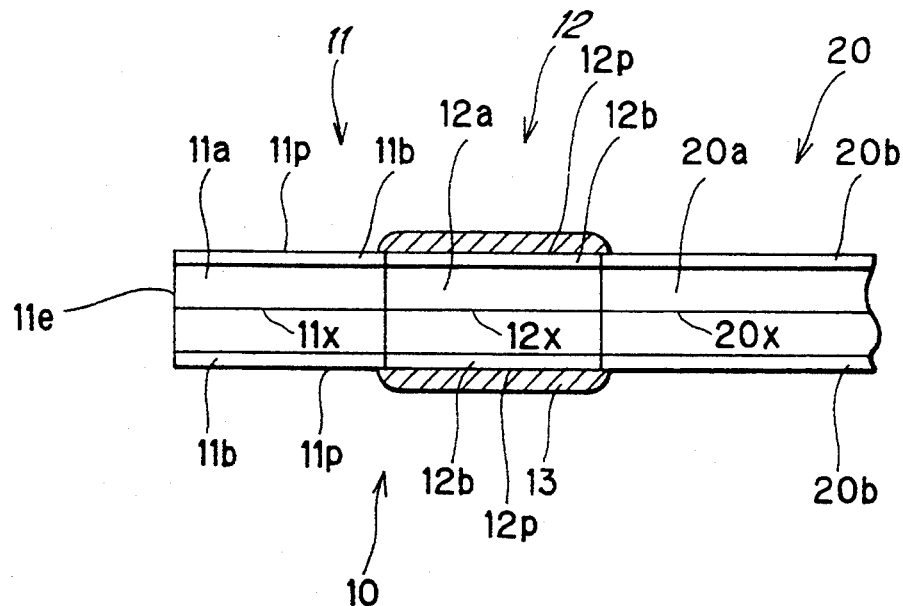
FIG. 3 (a) is a cross-sectional diagram schematically showing a structure of a probe of the scintillation counter of FIG. 2.
Figure 3:
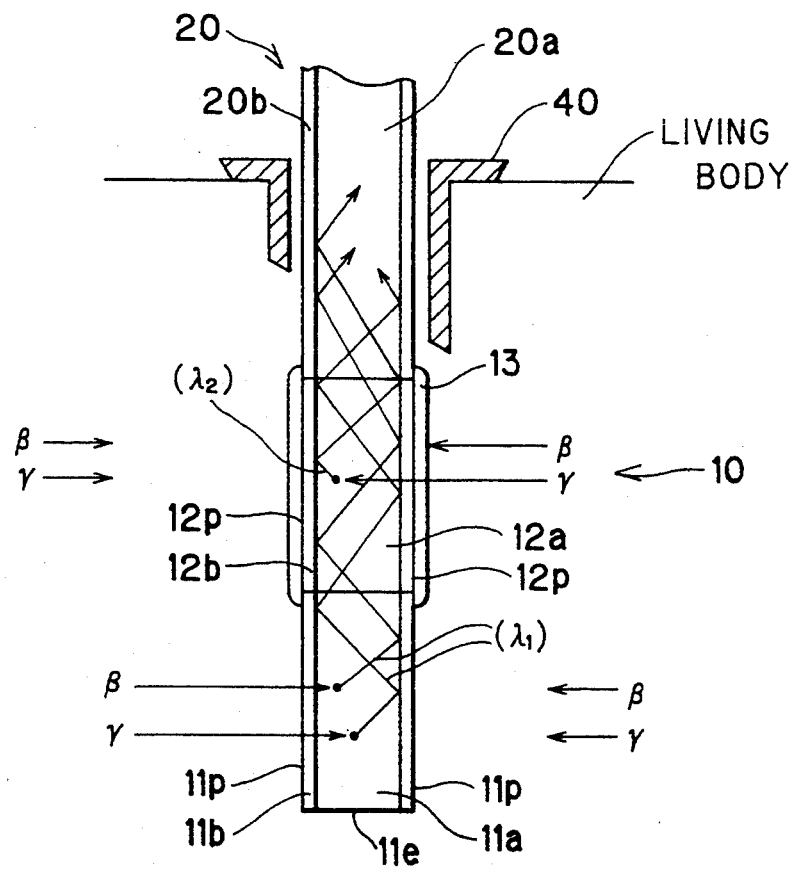

As shown in FIG. 3 (b), in order to detect $\beta$-rays in a living object injected with radioactive substance, a hollow needle 40 is first inserted into a skin of the living object. Then, the probe 10 is inserted into the hollow needle 40 so as to expose a peripheral surface 11p of the scintillation fiber 11 (i.e., an outer surface of the clad 11b) and an outer surface of the $\beta$-ray shield 13 in the living object. Accordingly, $\beta$- and $\gamma$- rays strike both the peripheral surface 11p of the scintillation fiber 11 and the outer surface of the $\beta$-ray shield 13. The $\beta$- and $\gamma$- rays striking the peripheral surface 11p enter the core 11a of the fiber 11 through the clad 11b, upon which a flash of scintillation light of wavelength $\lambda_1$ generates in the core. The scintillation light is repeatedly totally internally reflected at the interface between the core and the clad to be propagated toward the core 12a of the scintillation fiber 12. The scintillation light is then repeatedly totally internally reflected at the interface between the core 12a and the clad 12b to be propagated in the core 12a toward the optical fiber 20.

It is noted that because the tip end surface 11e of the scintillation fiber 11 is also exposed in the living body, $\beta$- and $\gamma$- rays also strike the tip end surface 11e and enter the fiber 11 to generate the scintillation flash therein. However, because an area of the tip end surface 11e is very small relative to the area of the peripheral surface 11p, the amount of $\beta$- and $\gamma$- rays entering the fiber 11 through the tip end surface 11e is very small relative to that of $\beta$- and $\gamma$- rays entering the fiber 11 through the peripheral surface 11p. Accordingly, $\beta$- and $\gamma$- rays enter the fiber 11 mainly through the peripheral surface 11p.

The $\beta$-ray shield film 13 prevents the $\beta$ rays striking the outer surface thereof from being incident on the peripheral surface 12p of the fiber 12. Only the $\gamma$ rays can be incident on the peripheral surface 12p of the fiber 12. The $\gamma$ rays enter the core 12a through the clad 12b, upon which a flash of scintillation light with wavelength $\lambda_2$ generates in the core. The scintillation light is repeatedly totally internally reflected at the interface between the core and the clad to be propagated toward the optical fiber 20.

The scintillation light of wavelengths $\lambda_1$ and $\lambda_2$ thus introduced into the optical fiber 20 are then repeatedly totally internally reflected at the interface between a core 20a and a clad 20b of the optical fiber 20 to be propagated in the core 20a toward the detection portion 30.

Figure 3C:
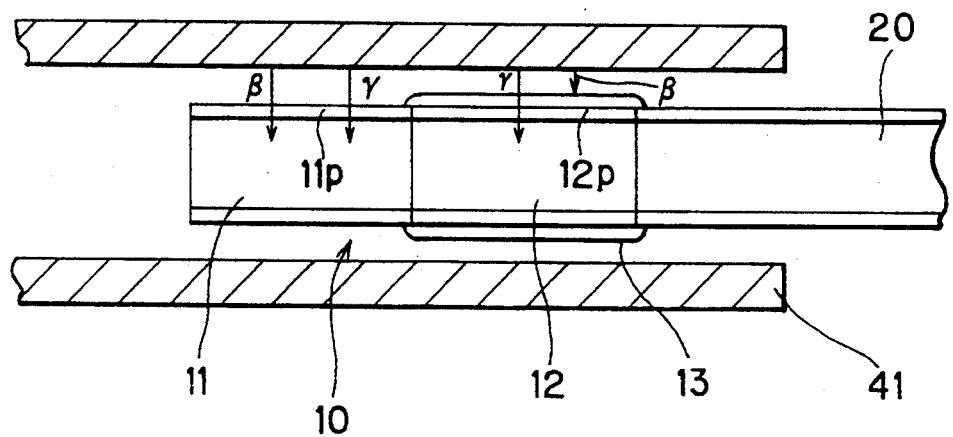

FIG. 3(c) shows the case where the probe 10 is inserted into a pipe 41 of a small diameter for detecting $\beta$-rays from radioactive contamination therein. Also in this case, $\beta$- and $\gamma$- rays enter the scintillation fiber 11 mainly through the peripheral surface 11p. $\gamma$- rays only enter the fiber 12 through the $\beta$-ray shield 13 and the peripheral surface 12p.

Scintillation fibers produced by Bicron Corporation can be used for the scintillation fibers 11 and 12. In concrete terms, scintillation fibers BCF-20 or BCF-28 (both generating scintillation light with wavelength of about 480 nm upon incidence of radiation thereto) are preferable for scintillation fiber 11, and scintillation fibers BCF-10 or BCF-12 (both generating scintillation light with wavelength of about 430 nm upon incidence of radiation thereto) are preferable for the scintillation fiber 12. It is noted that the scintillation fibers BCF-20 and BCF-28 should be used as the scintillation fiber 11 positioned at the tip end of the probe 10 opposite the optical fiber 20. This is because the material of the scintillation fibers BCF-20 and BCF-28 tend to absorb the shorter wavelength light emitted by BCF-10 and BCF-20. If the fibers BCF-20 and BCF-28 are used as the fiber 12, the fiber 12 will greatly absorb the light of wavelength $\lambda_1$ generated in the fiber 11 while transmitting the light therethrough. As a general rule, the material of scintillation fiber 12 connected to the optical fiber 20 should have a low absorption coefficient for the wavelength $\lambda_1$ generated by the scintillation fiber 11. More specifically, when preparing two scintillation fibers A and B with different wavelengths $\lambda_A$ and $\lambda_b$, it is necessary to compare the spectral absorption of the fiber A for wavelength $\lambda_B$ and that of the fiber B for wavelength $\lambda_A$. If the absorption coefficient of the fiber A for wavelength $\lambda_B$ is smaller than that of the fiber B for wavelength $\lambda_A$, the fiber A should be used as the fiber 12 and the fiber B should be used as the fiber 11. If the absorption coefficient of the fiber B for wavelength $\lambda_A$ smaller than that of the fiber A for wavelength $\lambda_B$, the fiber B should be used as the fiber 12 and the fiber A should be used as the fiber 11.

"Luminous" TC-500-15, produced by Asahi Chemical Industry Co., Ltd, are acceptable for the optical fiber 20.

The detection portion 30 is provided with:
a dichroic mirror 31 for separating the optical signal emitted from the optical fiber 20; optical detectors 32 and 33 for detecting the intensity of the two optical signals after they are separated; and
a calculator 34 for subtracting the intensity detected at the optical detectors 32 and 33.

Figure 4:
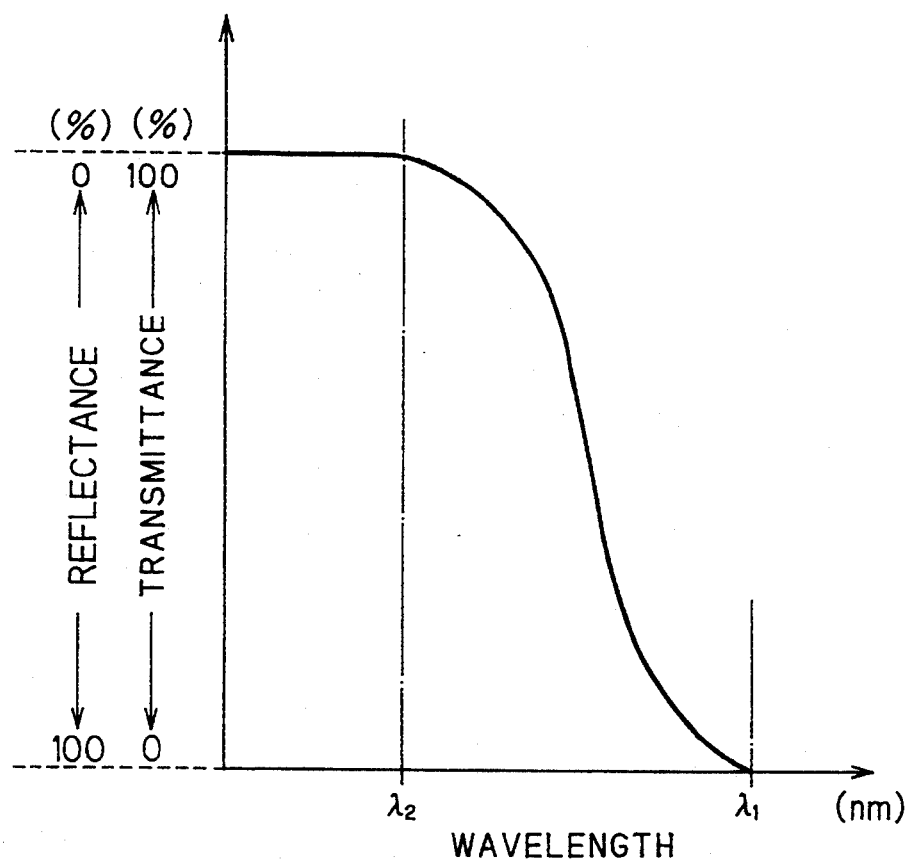
FIG. 4 is a diagram showing spectral characteristic of a dichroic mirror.

When the scintillation fiber 11 generates wavelength $\lambda_1$ and the scintillation fiber 12 generates wavelength $\lambda_2$, two optical signals, i.e., light with wavelength $\lambda_1$ (at intensity representing the total intensity of $\beta$ rays and $\gamma$ rays) and light with wavelength $\lambda_2$ (at intensity representing the intensity of only $\gamma$ rays) are both transmitted through the single optical fiber 20. The optical fiber 20 propagates or leads the optical signals toward the dichromatic mirror 31. As shown in FIG. 4, the dichromic mirror 31 reflects almost 100% of the optical signal with wavelength $\lambda_1$ and transmits almost 100% of the optical signal with wavelength $\lambda_2$. Therefore, light with wavelength $\lambda_1$ and light with wavelength $\lambda_2$ diverge to different optical paths upon being incident on the dichromatic mirror 31, the slantingly disposed dichromatic mirror 31 reflecting the light with wavelength $\lambda_1$ toward the optical detector 32 and transmitting the light with wavelength $\lambda_2$ toward the optical detector 33.

The optical detectors 32 and 33 detect the intensity of incident light, i.e., light with wavelengths $\lambda_1$ and $\lambda_2$ respectively. The intensity data detected by the optical detectors 32 and 33 from the optical signals is sent to the calculator 34 which determines the difference between the intensity data from the optical detector 33 and the intensity data from the optical detector 32. In other words, by determining the difference between the intensity data representing intensity of γ rays only (detected by the optical detector 33) and the intensity data representing intensity of both β rays and γ rays (detected by the optical detector 32), the intensity data of only β rays can be determined.

Figure 5A:
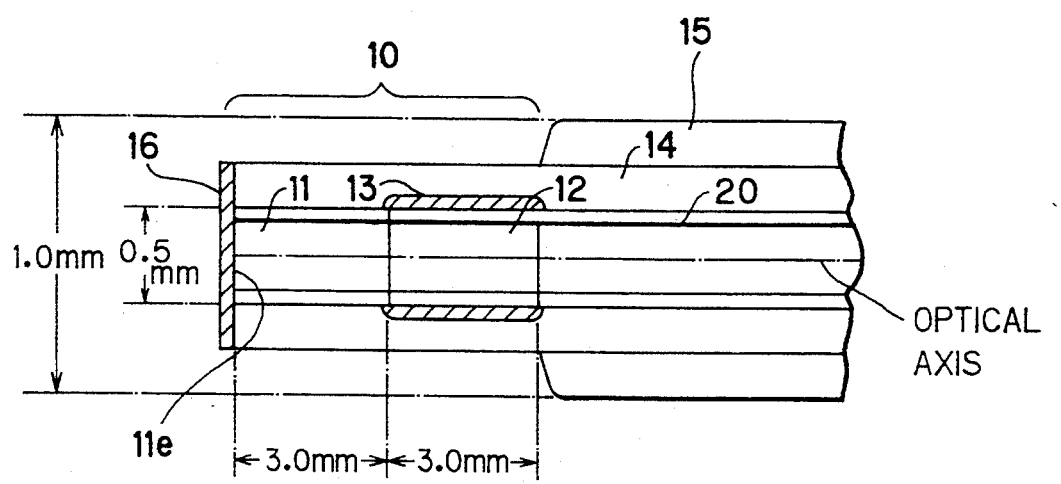
FIG. 5 (a) is a cross-sectional diagram showing one concrete example of structure of the area around the probe.
Figure 5B:
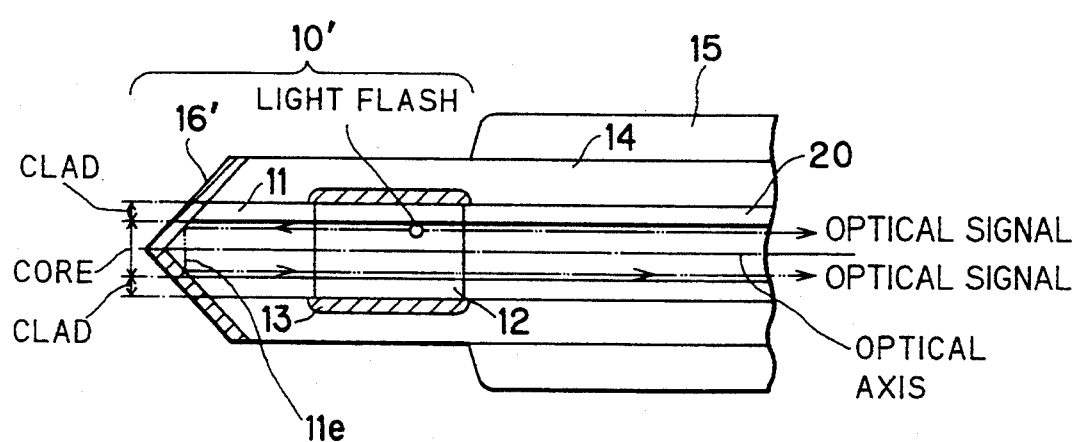

FIGS. 5 (a) is a cross-sectional diagram showing one concrete example of the structure around the probe 10. The scintillation fibers 11 and 12 are each about 3 mm long and have an external diameter of about 0.5 mm. The scintillation fiber 11, the β-ray shield 13, and the optical fiber 20 are covered with an optical shield pipe 14 made from, for example, aluminum, for blocking out visible light. The portion of the optical shield pipe 14 surrounding the optical fiber 20 is covered with a reinforcing pipe 15 made from, for example, 1.0 mm diameter stainless steel. A reflective film 16, made of, for example, aluminum, is added to the tip end 11e of the scintillation fiber 11. This reflective film 16 receives parts of the optical signals generated in the scintillation fibers 11 and 12, and reflects them back toward the optical fiber 20. This reflective film 16 thus increases a fraction of scintillation light propagating through the optical fiber 20 so they are effectively incident on the optical detectors 32 and 33.

As shown in FIG. 5 (b), sharpening the tip 11e of the scintillation fiber 11 to a point and adding a reflective film 16' thereafter produces a modified probe 10'. The angled surfaces produced by this sharpening process can more effectively reflect the scintillation light generated in the scintillation fibers 11 and 12 through the cores of the two scintillation fibers 11 and 12 toward the optical fiber 20. Taking the light flash shown in FIG. 5 (b) generated by the scintillation fiber 12 as an example, a portion of the scintillation light travels or propagates towards the optical fiber 20 while another portion passes through the scintillation fiber 11. The portion that passes through the scintillation fiber 11 reflects once off both the angled edges of the scintillation fiber 11, thereby reversing direction toward the optical fiber 20.

Figure 6:
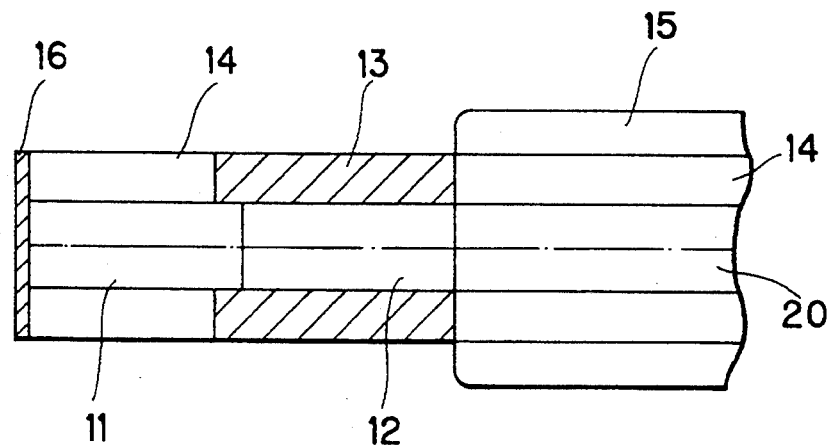
FIGS. 6(a), 6(b) and 6(c) are cross-sectional views showing various examples of structure of an area around the probe.
Figure 6:
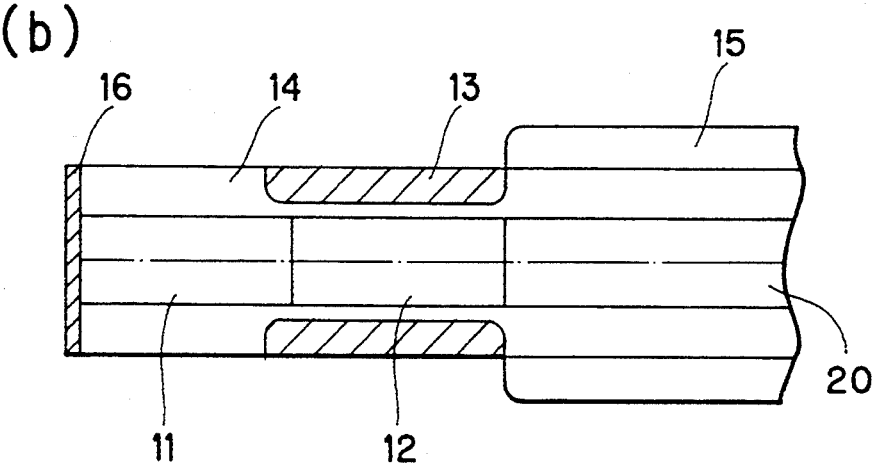
Figure 6:
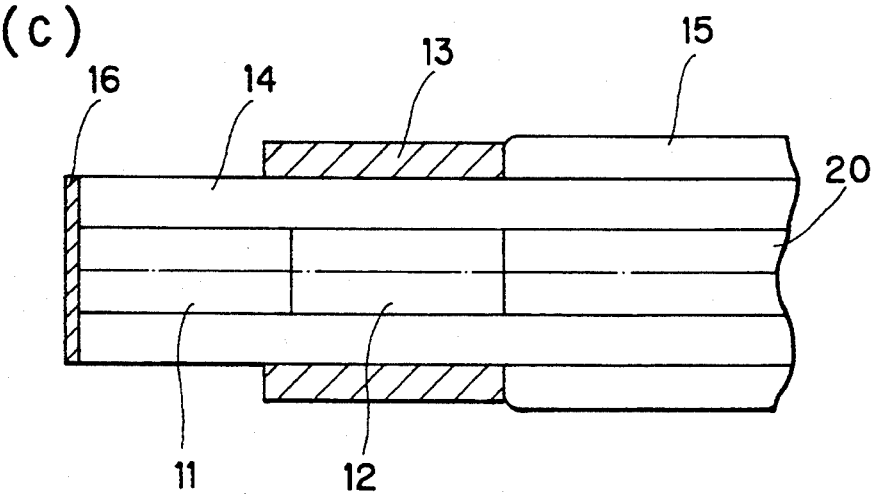
Figure 7:
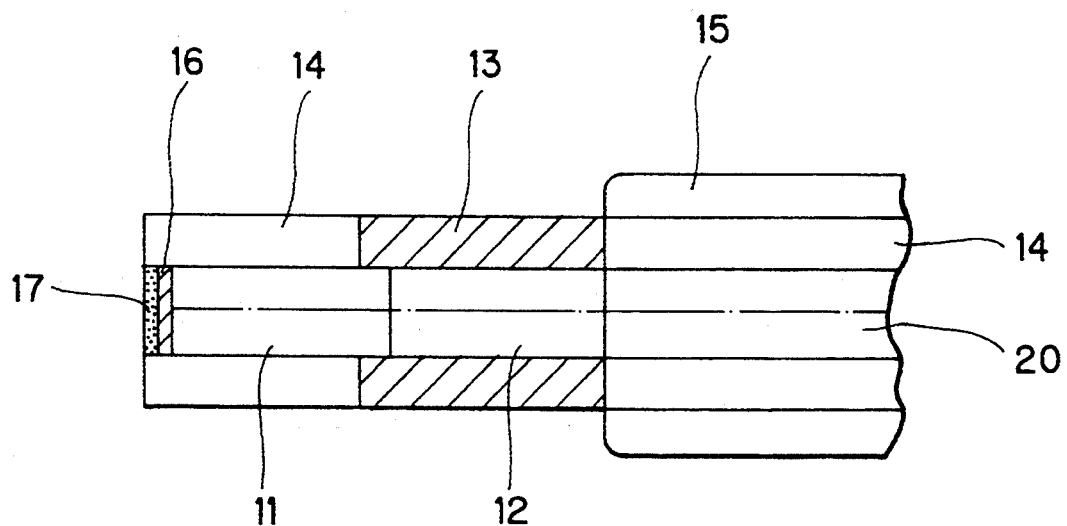
FIG. 7 is a cross-sectional view showing another example of structure of an area around the probe.

The β-ray shield 13 can be formed integrally with the optical shield pipe 14 as shown in FIG. 6 (a), buried in the optical shield pipe 14 as shown in FIG. 6 (b), or mounted externally around the optical shield pipe 14 as shown in FIG. 6 (c). As shown in FIG. 7, the tip end 11e may be further covered with a black pigment film 17 for blocking visible light.

Figure 8:
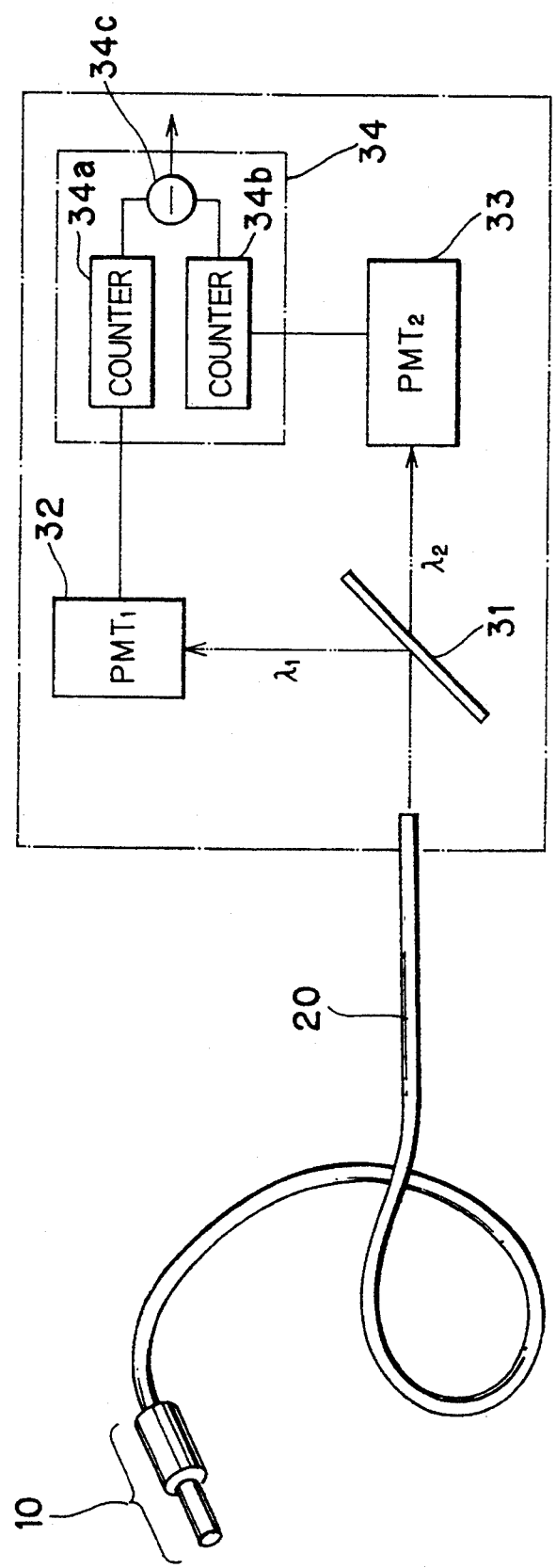
FIG. 8 is a block diagram showing a concrete example of a detection portion.

FIG. 8 is a block diagram showing a concrete example of the detection portion 30. The optical signals emitted from the optical fiber 20 are incident on the dichromatic mirror 31. The optical signal with wavelength $\lambda_1$ reflects off the dichromatic mirror 31 and is incident on the optical detector 32. The optical signal with wavelength $\lambda_2$ is transmitted through the dichromatic mirror 31 and is incident on the optical detector 33.

The optical detector 32 is provided with a photomultiplier tube (PMT) having a photocathode surface with a high sensitivity for light with wavelength $\lambda_1$. The optical detector 33 is provided with a photomultiplier tube (PMT) having a photocathode surface with a high sensitivity for light with wavelength $\lambda_2$. In the concrete example where the BCF-20 or -28 is used as the fiber 11 and the BCF-10 or -12 is used as the fiber 12, the optical detectors 32 and 33 detect wavelength $\lambda_1$ of 480 nm and wavelength $\lambda_2$ of 430 nm, respectively. Each of the detectors 32 and 33 should therefore preferably have a bialkali photocathode surface. This is because bialkali photocathode surfaces generally have a sensitivity peak in the ultraviolet range. If a scintillation fiber for generating wavelength $\lambda_1$ of 600 nm or more is used for the fiber 11, however, the optical detector 32 should preferably have a multialkali photocathode surface. This is because multialkali photocathode surfaces generally have a sensitivity peak for longer wavelengths than the bialkali photocathode surfaces. As a general rule, because the optical detector 32 is for detecting a wavelength ($\lambda_1$) longer than that ($\lambda_2$) detected by the optical detector 33, the detector 32 should be sensitive for wavelengths longer than those for which the optical detector 33 is sensitive.

The intensity signal detected by the optical detector 32 is applied to a photon counter 34a in the calculator 34 where an intensity value representing the total intensity of detected γ and β rays is determined. Similarly, the intensity signal detected at the optical detector 33 is applied to the other photon counter 34b of the calculator 34 where an intensity value representing the intensity of detected β rays is determined. It is noted that each of the photon counters 34a and 34b includes such devices as amplifiers, discriminators (single channel analyzers, for example), pulse-shaping circuits, a counter, etc. for performing a well-known photon counting operation. The difference between the values calculated at each counter 34a, 34b is taken in a subtraction portion 34c and outputted as intensity data on β rays only.

Figure 9:
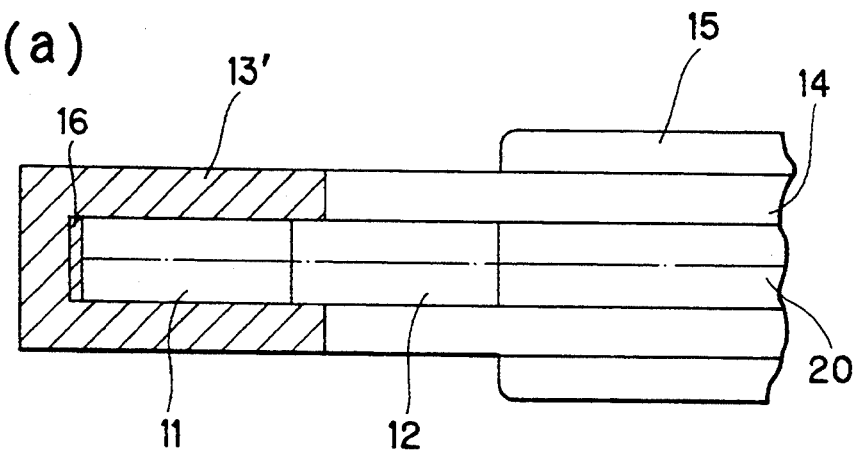
FIGS. 9(a), 9(b) and 9(c) are cross-sectional views showing various examples of structure of an area around the probe according to a second preferred embodiment of the present invention.
Figure 9:
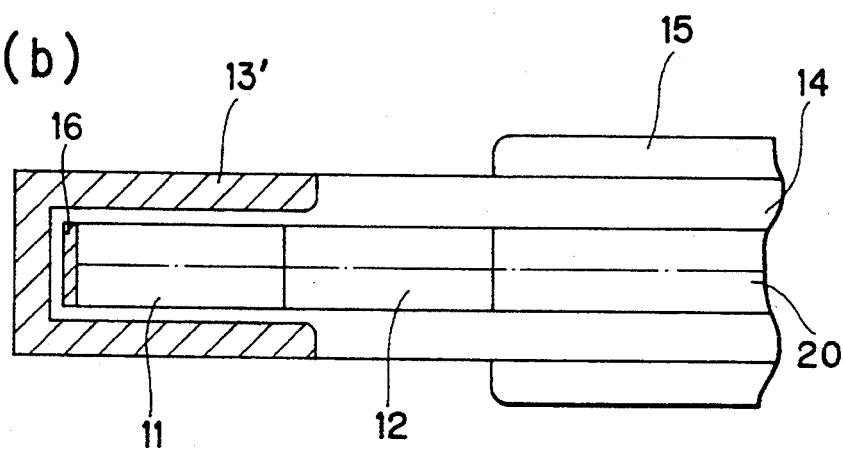
Figure 9:
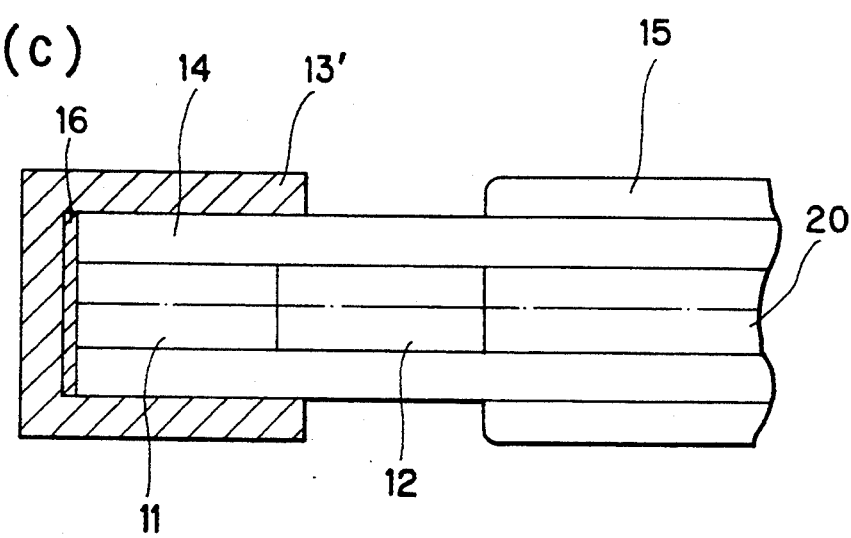

A scintillation counter according to a second preferred embodiment of the present invention will be described below with reference to FIGS. 9 (a) through 9 (c). In the first preferred embodiment, the scintillation fiber 12 is covered with the β-ray shield material 13. However, in the second embodiment, as shown in FIGS. 9(a), 9(b), and 9(c), the scintillation fiber 11 is covered with a β-ray shield 13', while the scintillation fiber 12 is not covered with the β-ray shield material. Accordingly, the scintillation fiber 11 measures γ rays only, and the scintillation fiber 12 measures both β- and γ- rays. Though the area of the tip end surface 11e is very small relative to the area of the peripheral surface 11p, it is preferable to prevent the β rays from being incident on the tip end surface 11e. Accordingly, the β-ray shield 13' is preferably cap shaped so as to cover not only the peripheral surface 11p but also the tip end surface 11e of the scintillation fiber 11.

As described above, according to the present invention, a scintillation fiber for detecting the intensity of only γ rays and a scintillation fiber for detecting the total intensity of γ rays and β rays are provided in series to a single probe. By calculating the difference between the detected values, the intensity of only β rays and of only γ rays can be determined.

The scintillation counter according to the present invention can therefore detect and provide the intensity of only γ rays and of only β rays using a single probe. Because only one probe is used, there is no second probe to block β rays, and therefore β rays have equal access to all sides of the probe. Also, connecting the two scintillation fibers in serial into a single probe sets a single positional relationship between the two scintillation fibers and the object to be measured. Therefore, there is no polarity in regards to the position of the object to be measured, thereby improving the precision of measurements.

Further, a single probe is thinner than two probes, and can therefore be more easily inserted into a living body which reduces damage to the living body compared to inserting two probes.

While the invention has been described in detail with reference to specific embodiments thereof, it would be apparent to those skilled in the art that various changes and modifications may be made therein without departing from the spirit of the invention.

For example, by exchanging the shield 13 or 13' for a shield that can block out α rays, positrons or other various kinds of radiations, the scintillation counter according to the present invention could be used for measuring intensities of α rays, positrons or other various kinds of radiations. Intensities of various kinds of radiation could be measured by exchanging the shield type.

Although in the first and second embodiments, a dichromatic mirror 31 is used as the light separation means, another wavelength selecting element can be used.

The above description describes only the manners of using the scintillation counter of the present invention to detect β rays in a living body and in a pipe with reference to FIGS. 3(b) and 3(c). However, the scintillation counter of the present invention is widely applicable to various types of in vivo and in vitro detection of β ray and various types of detection of β ray from radioactive contamination.

What is claimed is:

1. A scintillation counter for detecting an intensity of β rays, comprising:
   a probe portion including first and second scintillation fibers optically connected to each other in series, said first and second scintillation fibers generating scintillation light of different wavelengths upon incidence of radiation thereto, intensity of the scintillation light corresponding to an intensity of the incident radiation, the second scintillation fiber being covered with a β-ray shield;
   an optical fiber optically connected to said probe portion for transmitting the scintillation light generated at said probe portion;
   light separating means for separating, by wavelength, the scintillation light transmitted by said optical fiber;
   first light detecting means for detecting first intensity of the scintillation light generated at the first scintillation fiber and separated by said light separating means;
   second light detecting means for detecting second intensity of the scintillation light generated at the second scintillation fiber and separated by said light separating means, a difference between the first intensity and the second intensity indicating intensity of β rays; and
   difference calculating means for calculating the difference between the first intensity and the second intensity so as to obtain a value of intensity of β rays.

2. The scintillation counter as claimed in claim 1, wherein the first scintillation fiber extends along a first optical axis thereof for transmitting therealong the scintillation light generated therein, the first scintillation fiber having opposite ends along the first optical axis,
   wherein the second scintillation fiber extends along a second optical axis thereof for transmitting therealong the scintillation light generated therein, the second scintillation fiber having opposite ends along the second optical axis, and
   wherein one of the opposite ends of the first scintillation fiber and one of the opposite ends of the second scintillation fibers are optically connected in series with each other with the first and second optical axes being aligned with each other.

3. The scintillation counter as claimed in claim 2, wherein the first scintillation fiber has a peripheral surface extending parallel to the first optical axis between the opposite ends thereof for receiving radiation including β rays, the first scintillation fiber generating scintillation light of a first wavelength upon incidence of radiation including β rays thereto through the peripheral surface, and
   wherein the second scintillation fiber has a peripheral surface extending parallel to the second optical axis between the opposite ends thereof, the peripheral surface being covered with the β-ray shield for preventing β rays from being incident on the peripheral surface while allowing radiation of a kind other than β rays to be incident on the peripheral surface, the second scintillation fiber generating scintillation light of a second wavelength upon incidence of radiation of a kind other than β rays thereto through the β-ray shield and the peripheral surface, the second wavelength being different from the first wavelength.

4. The scintillation counter as claimed in claim 3, wherein said optical fiber extends along a fiber optical axis thereof, said optical fiber having opposite ends along the fiber optical axis, one of the opposite ends of said optical fiber being optically connected to the other one of the opposite ends of the first scintillation fiber with the fiber optical axis of said optical fiber being aligned with the first optical axis of the first scintillation fiber, the first scintillation fiber having a spectral absorption for light of the second wavelength lower than a spectral absorption of the second scintillation fiber for light of the first wavelength.

5. The scintillation counter as claimed in claim 3, wherein said optical fiber extends along a fiber optical axis thereof, said optical fiber having opposite ends along the fiber optical axis, one of the opposite ends of said optical fiber being optically connected to the other one of the opposite ends of the second scintillation fiber with the fiber optical axis of said optical fiber being aligned with the second optical axis of the second scintillation fiber, the second scintillation fiber having a spectral absorption for light of the first wavelength lower than a spectral absorption of the first scintillation fiber for light of the second wavelength.

6. The scintillation counter as claimed in claim 3, wherein the peripheral surfaces of the first scintillation fiber and the second scintillation fiber are covered with a light shield film for preventing a visible light from being incident on the peripheral surfaces, the β-ray shield being provided on the light shield film at the peripheral surface of the second scintillation fiber.

7. The scintillation counter as claimed in claim 3, wherein the peripheral surface of the first scintillation fiber is covered with a light shield film for preventing a visible light from being incident on the peripheral surface, the light shield film being integrated with the 6-ray shield provided on the peripheral surface of the second scintillation fiber.

8. A scintillation counter for detecting an intensity of a desired kind of radiation, comprising:
   a measurement scintillation fiber having first and second ends along a first longitudinal optical axis thereof and having a peripheral surface extending parallel to the longitudinal optical axis between the first and second ends, said measurement scintillation fiber receiving a desired kind of radiation and another kind of radiation incident on the peripheral surface thereof and generating a first scintillation light having a first wavelength and having an intensity corresponding to a total intensity of the desired kind of radiation and the other kind of radiation;

a reference scintillation fiber having first and second ends along a longitudinal optical axis thereof and having a peripheral surface extending parallel to the longitudinal optical axis between the first and second ends, the peripheral surface being covered with a radiation shield film for preventing the desired kind of radiation from being incident on the peripheral surface while allowing the other kind of radiation to be incident on the peripheral surface, said reference scintillation fiber generating a second scintillation light having a second wavelength different from the first wavelength and having an intensity corresponding to an intensity of the other kind of radiation, the first end of said reference scintillation fiber being optically connected in series to the first end of said measurement scintillation fiber so as to axially align said reference scintillation fiber with said measurement scintillation fiber;

an optical fiber having first and second ends along a fiber longitudinal optical axis thereof, the first end of said optical fiber being optically connected to one of the second end of said measurement scintillation fiber and the second end of said reference scintillation fiber for receiving the first and second scintillation lights generated in said first and second scintillation fibers, said optical fiber transmitting the first and second scintillation lights from the first end toward the second end;

light separating means positioned confronting to the second end of said optical fiber for receiving the first and second scintillation lights transmitted to the second end and separating the first and second scintillation lights from each other;

a first light detecting means for receiving the first scintillation light separated by said light separating means and detecting the intensity of the first scintillation light representative of the total intensity of the desired kind of radiation and the other kind of radiation, said first light detecting means producing a first signal indicative of a value of the total intensity of the desired kind of radiation and the other kind of radiation;

a second light detecting means for receiving the second scintillation light separated by said light separating means and detecting the intensity of the second scintillation light representative of the intensity of the other kind of radiation, said second light detecting means producing a second signal indicative of a value of the intensity of the other kind of radiation; and difference calculating means for receiving the first and second signals and calculating a value of difference between the value indicated by the second signal and the value indicated by the first signal which indicates a value of intensity of the desired kind of radiation.

9. The scintillation counter as claimed in claim 8, wherein said light separating means includes a dichroic mirror for reflecting one of the first and second scintillation lights and for transmitting the other one of the first and second scintillation lights.

10. The scintillation counter as claimed in claim 9, wherein each of said first and second light detecting means includes a photomultiplier tube.

11. The scintillation counter as claimed in claim 8, wherein each of the peripheral surfaces of said measurement scintillation fiber and said reference scintillation fiber is covered with a light shield film for preventing a visible light from being incident on the corresponding peripheral surface.

12. The scintillation counter as claimed in claim 8, wherein the first end of said optical fiber is optically connected to the second end of said measurement scintillation fiber, said measurement scintillation fiber receiving, at the first end thereof, the second scintillation light emitted from the first end of said reference scintillation fiber, and transmitting the second scintillation light from the first end toward the second end of said measurement scintillation fiber, said measurement scintillation fiber emitting the first and second scintillation lights from the second end thereof to the first end of said optical fiber.

13. The scintillation counter as claimed in claim 12, wherein said measurement scintillation fiber has a spectral absorption for the second scintillation light lower than the spectral absorption of said reference scintillation fiber for the first scintillation light.

14. The scintillation counter as claimed in claim 12, wherein the second end of said reference scintillation fiber is covered with the radiation shield film for preventing the desired kind of radiation from being incident on the second end of said reference scintillation fiber.

15. The scintillation counter as claimed in claim 12, further comprising a reflective layer formed on the second end of said reference scintillation fiber for reflecting the second scintillation light generated in said reference scintillation fiber and the first scintillation light generated in said measurement scintillation fiber and transmitted through said reference scintillation fiber so as to cause the first and second scintillation lights to be transmitted through said reference scintillation fiber and said measurement scintillation fiber toward the first end of said optical fiber.

16. The scintillation counter as claimed in claim 8, wherein the first end of said optical fiber is optically connected to the second end of said reference scintillation fiber, said reference scintillation fiber receiving, at the first end thereof, the first scintillation light emitted from the first end of said measurement scintillation fiber, and transmitting the first scintillation light from the first end toward the second end of said reference scintillation fiber, said reference scintillation fiber emitting the first and second scintillation lights from the second end thereof to the first end of said optical fiber.

17. The scintillation counter as claimed in claim 16, wherein said reference scintillation fiber has a spectral absorption for the first scintillation light lower than the spectral absorption of said measurement scintillation fiber for the second scintillation light.

18. The scintillation counter as claimed in claim 16, further comprising a reflective layer formed on the second end of said measurement scintillation fiber for reflecting the first scintillation light generated in said measurement scintillation fiber and the second scintillation light generated in said reference scintillation fiber and transmitted through said measurement scintillation fiber so as to cause the first and second scintillation lights to be transmitted through said measurement scintillation fiber and said reference scintillation fiber toward said optical fiber.

19. The scintillation counter as claimed in claim 8, wherein said measurement scintillation fiber generates the first scintillation light upon incidence of a $\beta$-ray and a $\gamma$-ray to the peripheral surface thereof, the first scintillation light having the intensity corresponding to a total intensity of the $\beta$- and $\gamma$-rays.

20. The scintillation counter as claimed in claim 19, wherein the radiation shield film prevents a $\beta$-ray from being incident on the peripheral surface of said reference scintillation fiber while allowing the $\gamma$-ray to be incident on the peripheral surface, said reference scintillation fiber generating the second scintillation light upon incidence of the $\gamma$-ray to the peripheral surface, the second scintillation light having the intensity corresponding to an intensity of the incident $\gamma$-ray, and wherein said first light detecting means produces the first signal indicative of the total intensity of the $\beta$- and $\gamma$-rays and said second light detecting means produces the second signal indicative of the intensity of the $\gamma$-ray, said difference calculating means calculates a value of difference between the value indicated by the second signal and the value indicated by the first signal which indicates a value of intensity of the $\beta$-ray.

21. A scintillation probe for detecting an intensity of a desired kind of radiation, comprising:

a measurement scintillation fiber having first and second ends along a first longitudinal optical axis thereof and having a peripheral surface extending parallel to the longitudinal optical axis between the first and second ends, said measurement scintillation fiber receiving a desired kind of radiation and another kind of radiation incident on the peripheral surface thereof and generating a first scintillation light having a first wavelength and having an intensity corresponding to a total intensity of the desired kind of radiation and the other kind of radiation; and a reference scintillation fiber having first and second ends along a longitudinal optical axis thereof and having a peripheral surface extending parallel to the longitudinal optical axis between the first and second ends, the peripheral surface being covered with a radiation shield film for preventing the desired kind of radiation from being incident on the peripheral surface while allowing the other kind of radiation to be incident on the peripheral surface, said reference scintillation fiber generating a second scintillation light having a second wavelength different from the first wavelength and having an intensity corresponding to an intensity of the other kind of radiation, the first end of said reference scintillation fiber being optically connected in series to the first end of said measurement scintillation fiber so as to axially align said reference scintillation fiber with said measurement scintillation fiber.

22. The scintillation probe as claimed in claim 21, further comprising an optical fiber having first and second ends along a fiber longitudinal optical axis thereof, the first end of said optical fiber being optically connected to one of the second end of said measurement scintillation fiber and the second end of said reference scintillation fiber for receiving the first and second scintillation lights generated in said first and second scintillation fibers, said optical fiber transmitting the first and second scintillation lights from the first end toward the second end.

23. The scintillation probe as claimed in claim 22, further comprising light separating means positioned confronting to the second end of said optical fiber for receiving the first and second scintillation lights transmitted to the second end and separating the first and second scintillation lights from each other.

* * * * *